US010061012B2

(12) United States Patent
Koski et al.

(10) Patent No.: US 10,061,012 B2
(45) Date of Patent: Aug. 28, 2018

(54) LOCATING AND RANGING USING COHERENT ARRAY RECONCILIATION TOMOGRAPHY

(71) Applicant: Worcester Polytechnic Institute, Worcester, MA (US)

(72) Inventors: Antti E. Koski, Hudson, NH (US); David Cyganski, Holden, MA (US); R. James Duckworth, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 463 days.

(21) Appl. No.: 14/701,977

(22) Filed: May 1, 2015

(65) Prior Publication Data

US 2017/0038455 A1     Feb. 9, 2017

Related U.S. Application Data

(60) Provisional application No. 61/987,666, filed on May 2, 2014, provisional application No. 61/987,680, filed on May 2, 2014.

(51) Int. Cl.
*G01S 5/06* (2006.01)
*G01S 5/02* (2010.01)
(Continued)

(52) U.S. Cl.
CPC .......... *G01S 5/0278* (2013.01); *G01S 5/0252* (2013.01); *G01S 5/06* (2013.01); *G01S 5/22* (2013.01); *G01S 1/02* (2013.01)

(58) Field of Classification Search
CPC .............................. G01S 5/0278; G01S 5/0273
(Continued)

(56) References Cited

U.S. PATENT DOCUMENTS 7,292,189 B2   11/2007   Orr et al.
8,928,459 B2   1/2015   Cyganski et al.
(Continued)

FOREIGN PATENT DOCUMENTS

WO   WO 2004016032 A1   2/2004
WO   WO-2008156700 A2 *   12/2008   ............. G01S 1/026

OTHER PUBLICATIONS

N. Arrue, M. Losada, L. Zamora-Cadenas, A. Jimenez-Irastorza and I. Velez, "Design of an IR-UWB Indoor Localization System Based on a Novel RTT Ranging Estimator," 2010 First International Conference on Sensor Device Technologies and Applications, Venice, 2010, pp. 52-57.*

(Continued)

*Primary Examiner* — Gregory C. Issing
(74) *Attorney, Agent, or Firm* — Chapin IP Law, LLC

(57) ABSTRACT

A ranging and tracking system and method employs a Coherent Array Reconciliation Tomography (CART) approach that benefits from a series of samples gathered from deployed receivers in an area of interest, and applies a sequence of matrix operations and transformations to data defining locations in a Cartesian grid space for summing constructive characteristics in a received waveform for identifying a leading edge indicative of a time of arrival (TOA) from a signal source, and computing a metric based on the distance to the signal source. Sampled waveform information (data) from multiple locations in the area of interest allows computation of a likelihood metric for each location in the grid space of containing the signal source. Rendering of the grid space location having the highest likelihood metric illustrates a position of the signal source, and may be graphically depicted clustering of the locations depicting a high likelihood.

21 Claims, 10 Drawing Sheets

(51) Int. Cl.
*G01S 5/22* (2006.01)
*G01S 1/02* (2010.01)

(58) Field of Classification Search
USPC .................................. 342/451, 458, 464
See application file for complete search history.

(56) References Cited

U.S. PATENT DOCUMENTS

| | | | |
|---|---|---|---|
| 2008/0113672 A1 | 5/2008 | Karr et al. | |
| 2012/0293372 A1* | 11/2012 | Amendolare | G01S 5/02 342/451 |
| 2013/0038488 A1 | 2/2013 | Cyganski et al. | |
| 2013/0099975 A1 | 4/2013 | Cyganski et al. | |
| 2013/0130710 A1 | 5/2013 | Boyer et al. | |

OTHER PUBLICATIONS

M. Navarro, P. Closas and M. Nájar, "Assessment of Direct Positioning for IR-UWB in IEEE 802.15.4a channels," 2013 IEEE International Conference on Ultra-Wideband (ICUWB), Sydney, NSW, 2013, pp. 55-60.*

Bar-Shalom et al, "Direct positioning of stationary targets using MIMO radar",Signal Processing,vol. 91,Issue 10,pp. 2345-2358, Oct. 2011.*

J. Coyne, D. Cyganski and R. J. Duckworth, "FPGA-Based Co-processor for Singular Value Array Reconciliation Tomography," 2008 16th International Symposium on Field-Programmable Custom Computing Machines, Palo Alto, CA, 2008, pp. 163-172.*

Cavanaugh et al "WPI Precision Personnel Locator: Inverse SyntheticArray Reconciliation Tomography Performance," ION-IEEE ITM 2013 Session C3: Urban, Indoor, and Terrestrial Applications I, Jan. 28-30, 2013, pp. 1-8.*

O. Bialer, D. Raphaeli, and A. J. Weiss, "Maximum-likelihood Direct Position Estimation in Dense Multipath," IEEE Transactions on Vehicular Technology, vol. 62, Jun. 2013.

D. Dardari, A. C. and U. Ferner, A. Giorgetti, and M. Win, "Ranging with Ultrawide Bandwidth Signals in Multipath Environments," Proceedings of the IEEE, vol. 97, Feb. 2009.

International Search Report, PCT/US2015/028785, dated Aug. 20, 2015, pp. 2.

* cited by examiner

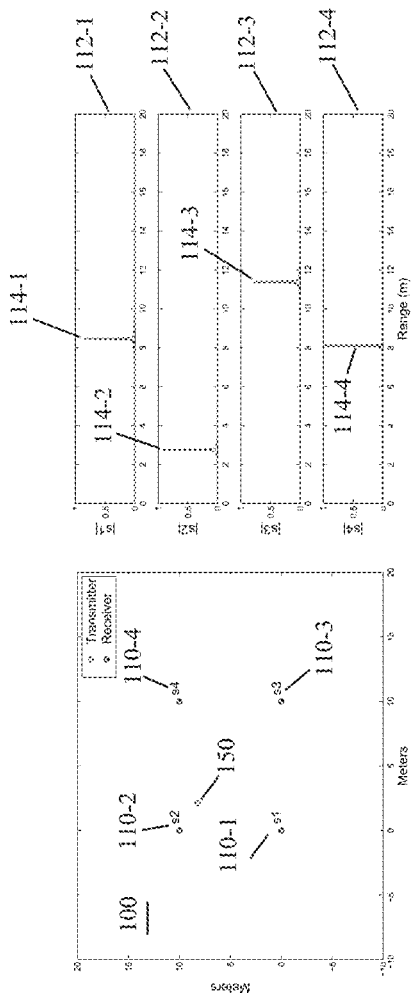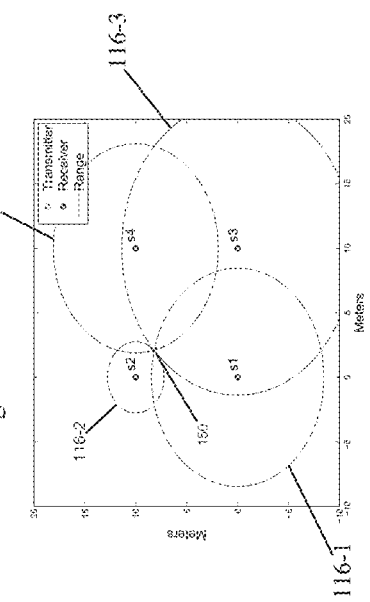

$$\zeta_{(x,y)_C} = \frac{1}{(\eta_{(x,y)} + \eta_{\Upsilon})} \underbrace{\frac{\sigma_{F,1}^2}{(\xi_{(x,y)} + \sigma_{\Upsilon}^2)}}_{180} \underbrace{\frac{\bar{F}_{(x,y)}}{(\bar{G}_{(x,y)} + P_{\Upsilon})}}_{184}$$

Assumed to be all noise ← 186

Minimum of respective metric calculated from matrix A $\bar{A} = IFFT(A)(1:\alpha,:)$ $P_{\Upsilon} = \frac{1}{N\alpha} \sum_{j=0}^{\alpha-1} \sum_{i=1}^{N} |\bar{a}_{i,j}|^2$ ← Elements of matrix $\bar{A} = U_{\bar{A}} \Lambda_{\bar{A}} V_{\bar{A}}^H$ $\eta_{\Upsilon} = \sum_{l=0}^{\alpha-1} |U_{\bar{A}}^a - \hat{w}_{\bar{A}} s_{\alpha,tx}| \Lambda_{\Upsilon}^a$ ← Similarity to known signal $D_{(x,y)} = A \cdot * B(x,y)$ $Z_{(x,y)} = IFFT(D_{(x,y)})$ $F_{(x,y)} = Z_{(x,y)}(1:\alpha,:)$ $G_{(x,y)} = Z_{(x,y)}(M - \gamma + 1:M,:)$ $F_{(x,y)} = U_F \Lambda_F V_F^H$ ⎫
$G_{(x,y)} = U_G \Lambda_G V_G^H$ ⎬ SVD $\bar{F}_{(x,y)} = \frac{1}{N\alpha} \sum_{j=0}^{\alpha-1} \sum_{i=1}^{N} |f_{i,j(x,y)}|^2$ ⎫ Power
$\bar{G}_{(x,y)} = \frac{1}{N\gamma} \sum_{j=0}^{\gamma-1} \sum_{i=1}^{N} |g_{i,j(x,y)}|^2$ $\eta_{(x,y)} = \sum_{l=0}^{\alpha-1} |u_{F,1}^T - (u_{F,1}^T s_{\alpha,tx}^* (s_{\alpha,tx}^H s_{\alpha,tx})^{-1}) s_{\alpha,tx}|$ Contribution of $i^{th}$ Sensor $\xi_{(x,y)} = \sum_{i=1}^{N} \max\{\xi_{i,l(x,y)} < R_i\}$

Fig. 5

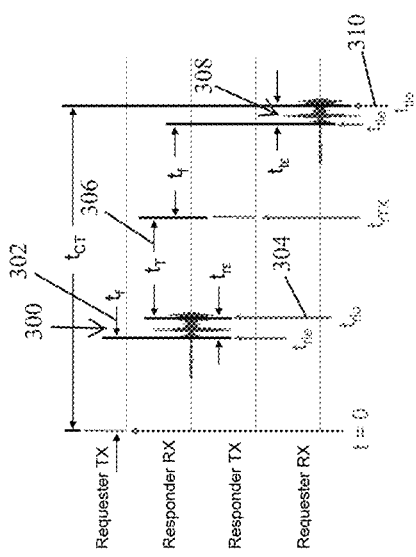

LOCATING AND RANGING USING COHERENT ARRAY RECONCILIATION TOMOGRAPHY

RELATED APPLICATIONS

This application claims the benefit under 35 U.S.C. § 119(e) of U.S. Provisional Patent Application No. 61/987,666 filed May 2, 2014, entitled "DATA ALIGNMENT FOR TWO WAY RANGING," and U.S. Provisional Patent Application No. 61/987,680 filed May 2, 2014, entitled "PRECISION LOCALIZATION IN THE PRESENCE OF MULTIPATH," both incorporated herein by reference in entirety.

This application is related to U.S. Pat. No. 8,928,459, filed Jun. 13, 2008, entitled "PRECISION LOCATION METHODS AND SYSTEMS," and U.S. Patent. Pub. No. 2012/0293372 filed Jan. 19, 2011, entitled "PRECISION LOCATION METHOD AND SYSTEM," both incorporated by reference in entirety.

STATEMENT REGARDING FEDERALLY SPONSORED RESEARCH AND DEVELOPMENT

The subject matter disclosed herein was developed with government support under Contract No. FA8721-05-C-0002 awarded by the Air Force. The Government has certain rights in the invention.

BACKGROUND

Electronic signal tracking has been used for decades in maritime environments to guide ocean-going ships. An early navigation system, LORAN, short for long range navigation, was a hyperbolic radio navigation system that employed triangulation from a set of land-based beacons to assist navigation. Accuracy was marginal, being a few hundred feet at best, but this was sufficient in an open ocean environment, and benefited from a generally flat and unobstructed path. More recently, consumer-oriented GPS (Global Positioning Systems) have become commonplace, using satellite ranging algorithms formerly deployed for military use. While suitable for general vehicle navigation, such systems enjoy a largely unobstructed path from the satellite beacons (transmitters) and are still susceptible to weather (overcast) conditions. Ranging and tracking in walled, indoor environments, such as for first responders and military applications, rarely benefits from line-of-sight proximity to a distressed subject. Indoor environments present a myriad of extraneous effects on propagated signals from metal framing and structural members as well as competing EMF (Electromagnetic Field) sources common in a modern structure wired for traditional electrical as well as broadband, optical and other Internet connectivity.

SUMMARY

A ranging and tracking system and method employs a Coherent Array Reconciliation Tomography (CART) approach that benefits from a series of samples gathered from deployed receivers in an area of interest, and applies a sequence of matrix operations and transformations to data defining locations in a Cartesian grid space for summing constructive characteristics in a received waveform for identifying a leading edge indicative of a time of arrival (TOA) from a signal source, and for computing a metric based on the distance to the signal source. Sampled waveform information (data) from multiple locations in the area of interest allows computation of a likelihood metric for each location in the grid space of containing the signal source. Graphic rendering of the likelihood metric illustrates a position of the signal source by clustering of the locations depicting a high likelihood.

Configurations herein are based, in part, on the observation that conventional approaches to indoor localization for determining a direction and range of a signal source (transmitter) employ a two-step approach for estimating range to the transmitter. In the conventional two step approach, the estimate of ranges from the transmitter to each receiver is done independently and is the first step in localization. This involves estimating the leading edge of the transmitted waveform at individual receiver locations to determine the range from the transmitter to each receiver, followed by some algorithm to find the transmitter position using the ranges. Conventional Leading Edge Detection (LED) algorithms typically include some combination of a Matched Filter (MF), an energy detector, and a threshold, followed by a search to determine the first arriving peak of the transmitted waveform. The independently estimated ranges suggest the transmitter can lie on a circle in two dimensions centered at the respective receive, as in conventional GPS approaches. Unfortunately, the two-step approach suffers from the shortcoming that they treat each receiver signal independently and perform localization as two independent steps. Such independent range estimates under multipath conditions, as in an indoor area of interest, will likely not have a single point of intersection. The ranges will therefore present an inconsistent set of constraints to a positioning algorithm.

In contrast, a Direct Positioning Algorithms (DPA) performs a single step range computation and allows improved accuracy and robustness to be achieved by considering the fact that the signal originated from the same source. Accordingly, configurations herein substantially overcome the above-described shortcomings by providing a DPA utilizing Coherent Array Reconciliation Tomography (CART) based on the segmentation of the received signals into two segments: one that should contain the leading edge of the signal embedded in noise and one that should contain noise only. The CART approach produces a simultaneous leading edge and position estimate based upon a search of consistent ranges to produce the simultaneous best estimate from among a Cartesian scan grid indicative of the area of interest. The disclosed CART approach employs UWB (Ultra-WideBand) Impulse Radio (IR) waveform features for facilitating leading edge detection. Graphical rendering of the Cartesian representation, such as on a video monitor and employing color schemes for representing the computed likelihood estimate, results in a distinct region or cluster indicating the transmitter location, such as may be worn by a victim in distress.

Conventional approaches include a Maximum Likelihood (ML) Direct Position Estimate (DPE) based on the collection of received data. The method expands upon their previous ML TOA estimation method using a single transmitter and a single receiver. As shown, the method partitions the received signal into two segments: one that is expected to contain noise only and one that is expected to contain the leading edge of the transmitted signal along with noise samples. In contrast to the disclosed approach, the ML DPE algorithm, requires the computation of a power delay profile, which is based upon a channel model or a measured channel impulse response. In reality, specular reflectors exist that will distort the ML DPE metric in an unknown environment when using a modeled channel and a measured channel impulse response is only optimal for a specific location and sensor geometry. In addition, the ML DPE is based on a power metric, when in reality there exists coherence among the received leading edges that can be included in the localization metric.

Other DPAs include a Singular value Array Reconciliation Tomography (SART) and a Transactional Array Reconciliation Tomography (TART), described in the related applications disclosed above, which employ the signal at each receiver along with knowledge of receiver positions. In the case of the SART approach, a TDOA (Time Difference of Arrival) is computed to avoid synchronization of the transmitter to the receiver. The TART approach performs TOA estimation using a transaction of data between the transmitters and receivers. The SART and TART approaches were designed to use a multicarrier wideband (MCW) non-impulsive signal, in contrast to the more impulsive UWB Impulse Radio (IR) waveform features as disclosed herein. The disclosed approach takes advantage of the UWB IR features with the simultaneous computational principles of the matrix operations.

In further detail, configurations herein teach a system and method for computing distance and range to a target associated with a signal source by generating a locator matrix based on a rephasing of a plurality of values derived from signal samples for each location in an area of interest defined by a Cartesian scan grid. The resulting locator matrix is indicative of a likelihood that, for each location in the scan grid, the matrix indicates the likelihood of containing the source of the sampled signal, and uses rephasing for accommodating a propagation delay in the sampled values. The locator matrix, or likelihood matrix therefore represents a scan grid of locations and undergoes a series of transformations, each applying a metric for refining the values defining the likelihood. The method selects, for each location in the scan grid, a first region of values from the locator matrix and a second region of values from the locator matrix, in which the first and second regions are chosen based on a periodicity of a time shift in the frequency domain of the sampled signals. An output rendering results from generating, based on the first region containing a leading edge of a signal from the signal source, and based on the second region containing noise, an image matrix indicative of, for each location in the scan grid, the likelihood that the selected location contains the signal source. The image matrix visually indicates, by coloring or shading of regions, the locations having the highest likelihood of containing the signal source, resulting in a clustering around the true location.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 1A is a context diagram of an area on interest suitable for use with configurations disclosed herein;

FIG. 1B shows a time of arrival graph of the receivers in FIG. 1A as indicated by pulse arrival at the receivers;

FIG. 1C shows triangulation of the transmitter location from the estimated ranges to the receivers of FIG. 1A;

FIG. 5 shows application of submetrics for generating and optimizing the likelihood matrix rendering;

FIG. 10 depicts leading edge detection in the configuration of FIG. 3.

DETAILED DESCRIPTION

Figure 2:
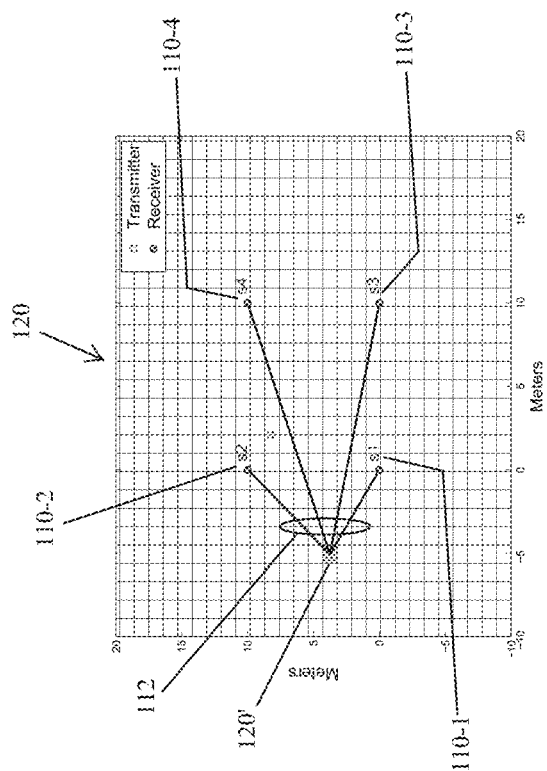
FIG. 2 shows the area of interest of FIG. 1 defined as a scan grid.

Depicted below is an example deployment scenario employing a plurality of sensors disposed in an area of interest for modeling an example interior environment. The area of interest is defined as a scan grid by superimposing a Cartesian grid, such that each location in the scan grid is populated using a metric for estimating the likelihood that the signal source is disposed in that location. A series of signal samples received at each of the receivers undergoes the disclosed transformations and array operations for generating and refining a likelihood matrix having a likelihood value for each location. The resulting likelihood matrix contains values that can be graphically rendered for visualizing a location of the transmitter, or may be incorporated in subsequent operations such as a homing wand described further below, rendering the highest likelihood location superimposed on another graphical rendering (such as a floor map), or other suitable output medium.

FIG. 1A is a context diagram of an area of interest suitable for use with configurations disclosed herein. Referring to FIG. 1A, in an area of interest 100, a plurality of receivers 110-1 . . . 110-4 (110 generally) occupy known locations. A transmitter defines a signal source 150 operable for transmitting a signal to each of the receivers 110. In an example configuration, the signal source 150 is configured for transmitting an Ultra-Wideband (UWB) Impulse Radio (IR) signal due to characteristics facilitating Leading Edge Detection (LED), however any suitable transmission medium may be employed.

FIG. 1B shows a time of arrival graph of the receivers in FIG. 1A, as indicated by pulse arrival at the receivers. Referring to FIGS. 1A and 1B, a range estimate 112-1 . . . 112-4 corresponding to each receiver 110 defines a signal peak 114-1 . . . 114-4 (114 generally), respectively, indicating the computed distance to the signal source 150. In the example arrangement, gathering the samples includes detecting a leading edge of a signal transmitted from the signal source 150, such that the leading edge is detected by waveform alignment. The signal peak 114 approximates detection of the leading edge of a transmitted signal, after accommodating multipath and other interference and propagation anomalies, discussed further below.

FIG. 1C shows triangulation of the transmitter location from the estimated ranges to the receivers of FIG. 1A. Referring to FIGS. 1A-1C, a circle 116-1 . . . 116-4 depicts the respective range 114 computed from each transmitter 110. In configurations herein, the computed range 112 defines a common intersection 150' for all receivers 110, indicating a sufficiently precise ranging computation to avoid multiple computed intersections resulting in location uncertainty as to the true location of the signal source. It should be noted that the ranging computations as disclosed herein may employ Two-Way Ranging (TWR), discussed further below, thus even though the signal source 150 (transmitter) and receivers 110 are labeled as such, each may define a requestor and responder transceiver unit used in the TWR event for computing a leading edge. Such two way ranging uses wireless synchronization, thus avoiding a wired connection to maintain timing or synchronization information.

Locating the signal source in the area of interest 100 uses the ranging computations from the various receivers 110 in the matrix operations. The method of locating the source of a signal 150 includes defining an area of interest as a discretized spatial region having a plurality of locations, such that the locations are defined by a scan grid based on Cartesian positions. A matrix processor or other computing device gathers, for each location in the area of interest, a set of sampled values indicative of a computed range to the signal source 150. The processor rephases the set of sampled values to generate a rephased set for accommodating a propagation delay in the sampled values. The processor subdivides the rephased set of values associated with each location into a first region and a second region based on periodicity of a time domain of the gathered signals, and determines if the first region is representative of a leading edge of a signal gathered from the signal source 150. The matrix processor computes, for each value in the rephased set, a metric based on comparing the first region and the second region, such that the metric is indicative of a computed likelihood that the particular location in the scan grid contains the signal source. The processor then generates a metric image indicative of the likelihood that, for each location in the scan grid, the location contains the signal source. An output device such as a video display renders an indication of the locations on the scan grid associated with the greatest likelihood of containing the signal source, such as by coloring or shading the scan grid based on the likelihood values. Such a graphical rendering may be utilized by a portable device for such purposes as locating a distressed party in a hazardous environment, such as burning buildings, hazmat responses, and military search/recovery.

FIG. 2 shows the area of interest of FIG. 1 defined as a scan grid 120. Referring to FIGS. 1A and 2, the scan grid 120 defines a discretized spatial region representing the area of interest for locating the signal source 150, such as a building. In the scan grid 120, each transmitter 110 defines a location 120' characterized by x and y coordinates. Each location 120' has a range 112 (distance) to each of the receivers 110 and to the signal source 150. Similarly, any location 120' in the scan grid may be attributed to a computed likelihood of containing the signal source 150. The discussion below illustrates the transformations and operations for generating a likelihood value for each location in the scan grid based on repeated samplings of signals received from the signal source 150 by each of the receivers 110.

A signal that has propagated through a multipath environment can be modeled as a summation of $L_i$ reflectors with different delay paths to $i=1 \ldots N$ receiving antennas. Mathematically, we can write the signal at the $i^{th}$ receiver as $$s_i(t) = \sum_{l=1}^{L_i} c_{l,i} p(t - \tau_{l,i}) + n_i(t) \tag{2.1}$$

where, $c_{l,i}$ represents the magnitude of the $l^{th}$ reflector in the environment to the $i^{th}$ antenna, $\tau_{l,i} = r_{l,i}/c$ is the $l^{th}$ delay from the transmitter to the $i^{th}$ receiver, c is the speed of light, $r_{l,i}$ is the range from the transmitter to the $i^{th}$ receiver following the $l^{th}$ propagation path, p(t) is the transmitted waveform, and $n_i(t)$ is the additive white Gaussian noise with variance $\sigma_i^2$. The indices l,i indicate the $l^{th}$ path to the $i^{th}$ receiver, assigning l,i as the direct path to the $i^{th}$ receiver.

The frequency domain representation used by the Direct Positioning algorithms (DPAs) can be computed using the Fourier Transform (FT) of the model and can be written as $$\begin{aligned} S_i(w) &= \sum_{l=1}^{L_i} c_{l,i} P(\omega) e^{-j\omega \tau_{l,s}} + N_i(w) \\ &= P(w) \sum_{l=1}^{L_i} c_{l,i} e^{-j\omega \tau_{l,i}} + N_i(w) \\ &= P(w) H_i(\omega) + N_i(w) \end{aligned} \tag{2.2}$$

where P(w) represents the FT of the transmitted signal, $H_i(w)$ represents the FT of the channel model to the $i^{th}$ receiver, and $N_i(w)$ the FT of the noise with power spectral density of $N_{D,i}/2$.

Digital analysis as disclosed herein requires the discretized form of the model, which can generally be written as:

$$S_i[k] = P[k] \sum_{l=1}^{L_i} c_{l,i} e^{-j2\pi f_k \tau_{l,i}} + N_i[k] \tag{2.3}$$

where $$f_k = f_{dec} \frac{k-1}{M}, \quad k = 1 \ldots M \tag{2.4}$$

Figure 3:
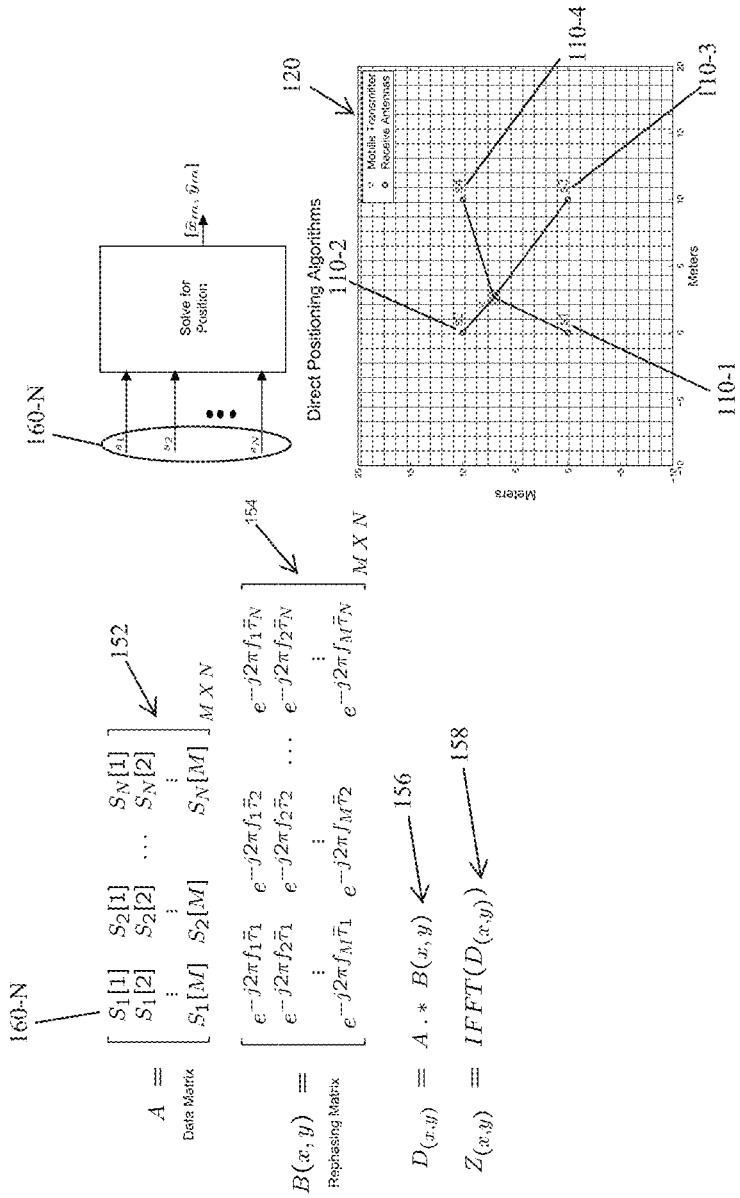
FIG. 3 shows a data matrix and rephasing matrix for locating a signal source in the area of interest of FIG. 1A.

FIG. 3 shows a data matrix and rephasing matrix for locating a signal source in the area of interest of FIG. 1A. Referring to FIG. 3, in the scan grid 120, a series of samples 160-N are received for each receiver 110 to generate a data matrix 152. It may facilitate understanding to note that the samples 160 represent a sequence received by each of the multiple receivers 110 over time, but the likelihood is computed for each location 120' in the scan grid 120. A rephasing matrix 154 is applied to generate a rephased matrix 156. An Inverse Discrete Fourier Transform (IDFT) yields Z(x,y) 158 as follows:

$$Z_{(x,y)} = F^{-1}(D_{(x,y)})$$

FIG. 3 therefore depicts the discretized spatial region (scan grid 120) to search. At each scan grid position (location 120'), we also produce a metric that represents a measure of the likelihood of the signal source 150. The value of this metric over the entire scan grid can be conveniently viewed as an image and will be referred to here as the metric image. As mentioned before, the CART approach coherently integrates the leading edge of all the receiver data available as part of the computation of this metric.

Using a full data matrix of frequency data 152 and the re-phasing matrix 154 at each scan grid location 120', matrix operations again produce the element wise multiplication of A 152 and B(x; y) 154. The scan grid position in the Cartesian domain is (x,y) and the corresponding rephased data matrix in the frequency domain is defined as D(x;y). Also applied is the IDFT of the data matrix 156 rephased to the current scan grid location, denoted above.

Figure 4:
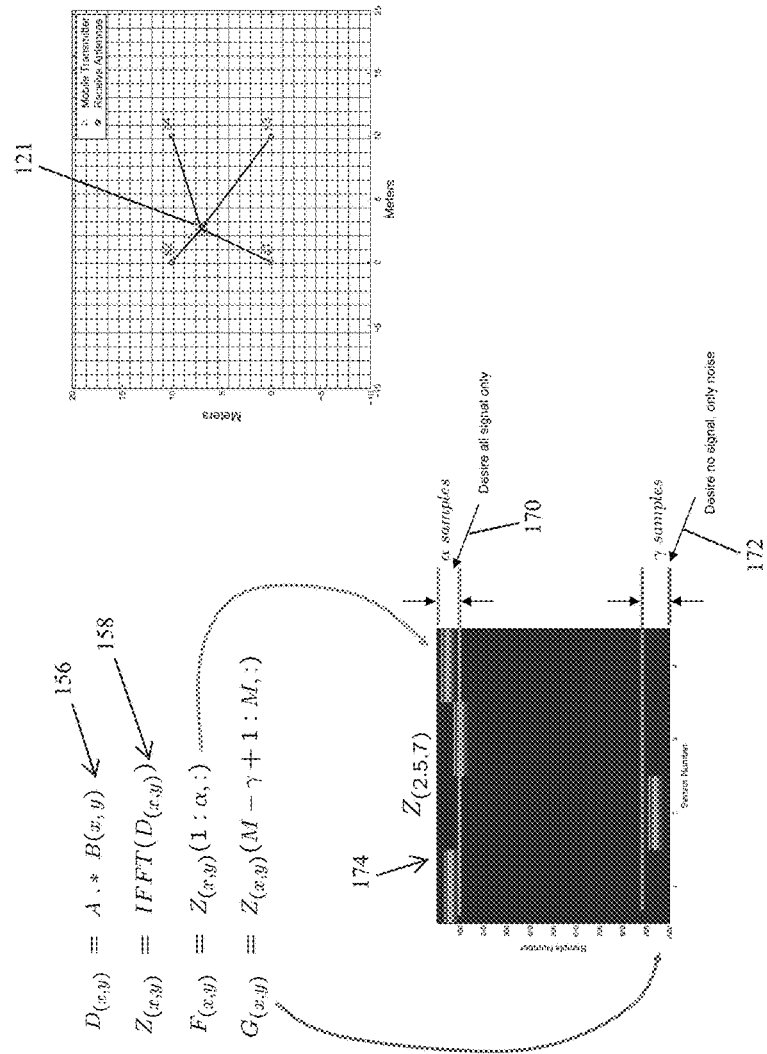
FIG. 4 shows the segmentation of the received signals into groups distinguished by inclusion of the leading edge.

FIG. 4 shows the segmentation of the received signals into groups distinguished by inclusion of the leading edge. The group segmentation depicts the Coherent Array Reconciliation Tomography (CART). The CART algorithm is operable with a UWB IR waveform in which only consistent solutions are searched and was designed based on the segmentation of the received signals into two segments: one that should contain the leading edge of the received signals embedded in noise and one that should contain noise only. The CART algorithm produces a simultaneous leading edge and position estimate based upon a search of consistent ranges to produce the simultaneous best estimate using signal fusion. Referring to FIGS. 3 and 4, the selected regions for each scan grid 120 position 120' are selected.

The CART metric at each scan grid position is computed by first breaking $Z_{(x,y)}$ into two regions of interest. The first region, which we denote by the matrix $F_{(x,y)}$, contains the first a elements of each column of $Z_{(x,y)}$ and the second region, which we denote by $G_{(x,y)}$, contains the last y elements of $Z_{(x,y)}$. In MATALB notation we can write these regions as $F_{(x,y)}=Z_{(x,y)}(1:\alpha,:)$ and $G_{(x,y)}=Z_{(x,y)}$ (end−y+1:end, :). These regions are chosen to take advantage of the periodicity of the time shift in the frequency domain, where indices not in the set (1 . . . M) are evaluated with modulus of M so that time shifts resulting in indices less than 1 become relative to M. If $(x_m,y_m)$ is the true transmitter position, $F_{(xm,ym)}$ will contain the leading edge of the transmitted signal and $G_{(xm,ym)}$ will contain noise only. When the current scan grid designated position under test is not the true transmitter position, $F_{x \neq xm, y \neq ym}$ will likely not contain the leading edge and $G_{x \neq xm, y \neq ym}$ will likely contain direct path or multipath signal in noise. The CART metric utilizes this knowledge in the formation of a likelihood that the transmitter originated from the current scan grid designated position under test.

In the example of FIGS. 3 and 4, the set of samples 160-N define the data matrix 152 indicative of a series of frequency samples taken from signals received from the signal source 150 at each of a plurality of receivers 110 in the area of interest 120, and the set of rephased values 154 defines a likelihood matrix indicative of a likelihood that the corresponding location contains the signal source. Further applying the CART metric includes designating the first region 170 based on a first subset of elements of the likelihood matrix corresponding to a particular scan grid location, and designating the second region 172 based on a last subset of elements of the likelihood matrix corresponding to a particular scan grid location 120'. The approach concludes that if the first region 170 includes the leading edge of the signal from the signal source, then the corresponding scan grid location 120' includes the signal source 150. This includes determining that if the second region is representative of only noise, then the first region is indicative of the true location of the signal source 150. A rendering of a corresponding image matrix 174 shows an example scan along with a point (2.5,7) 121. When this scan grid location 121 is chosen, the resulting shifted data matrix Z(2:5,7) is depicted as the image matrix 174. Further examination of receiver 2 (110-2) data shows that the current scan grid location of (2.5,7) is farther in range than the true transmitter position. The result is that the signal of receiver 2 110-2 is wrapped around and shifted into the G(x;y) region 172. The presence of anything other than noise content in the G(x;y) region should therefore result in a reduced metric value.

In the example configuration, subsequent operations include applying additional metrics, or submetrics. Therefore, the likelihood matrix now defined by Z(x,y) further comprises applying at least one of a similarity metric, a Singular Value Decomposition (SVD) metric and a power metric for the values of the likelihood matrix corresponding to each location.

FIG. 5 shows application of submetrics for generating and optimizing the likelihood matrix rendering. The resulting metric is a combination of these three submetrics. It is may be noted that the three submetrics were developed to improve the robustness of experimental position results based upon observations of outcomes on introducing experimental data. The power submetric operates reasonably well in simulation using heavy multipath, but may not excel in the presence of interference in experiments using an off the shelf ultra-wideband (UWB) data collection system. It was found by experimentation and simulation that the combination of these three submetrics resulted in the most robust localization result.

At each scangrid position, we start with the following computations:

$$F_{(x,y)} = U_F \Sigma_F V_F^H \quad (3.15)$$

$$G_{(x,y)} = U_G \Sigma_G V_G^H \quad (3.16)$$

$$\overline{F}_{(x,y)} = \frac{1}{N\alpha} \sum_{j=0}^{\alpha-1} \sum_{i=1}^{N} |f_{i,j(x,y)}|^2 \quad (3.17)$$

$$\overline{G}_{(x,y)} = \frac{1}{N\gamma} \sum_{j=0}^{\gamma-1} \sum_{i=1}^{N} |g_{i,j(x,y)}|^2 \quad (3.18)$$

where H represents the conjugate transpose, $f_{ij_{zy}}$ is the i,j$^{th}$ element of the matrix $F_{(z,y)}$, $g_{ij x,y}$ is the i,j$^{th}$ element of the matrix $G_{(x,y)}$, $U_F \Sigma_F V_F$ represents the SVD of the matrix $F_{(x,y)}$, and $U_G \Sigma_G V_G^H$ represents the SVD of the matrix $G_{(x,y)}$, $\overline{F}_{(x,y)}$ and $\overline{G}_{(x,y)}$ represent the power in the respective regions of the Z matrix and the SVD's reveal information that describes the degree of linear dependence of the respective regions of the Z matrix along with generating a useful orthonormal basis.

Figure 6:
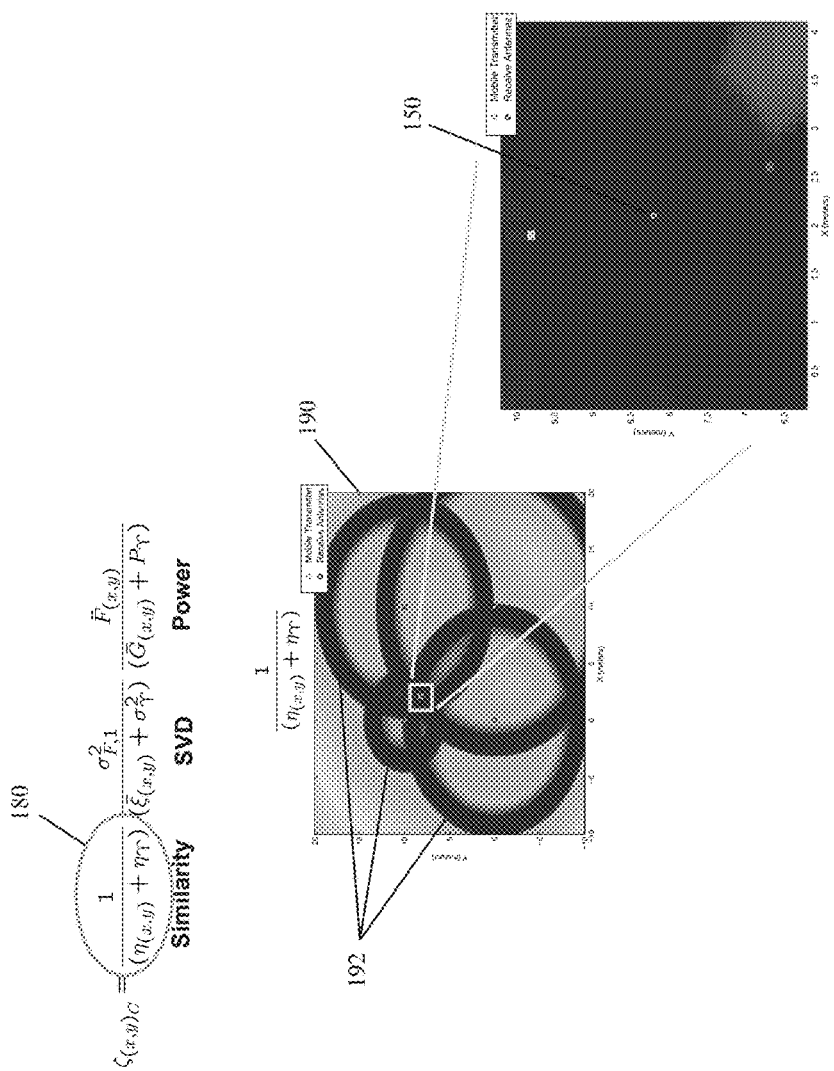
FIG. 6 shows a similarity metric applied to the likelihood matrix of FIG. 5.

Referring to FIG. 5, the similarity metric 180, SVD metric 182 and power metric 184 contribute to the final localization metric 186 corresponding to the CART approach disclosed herein. The similarity metric 180 is based on coherent integration of a leading edge of the sampled signal using a singular vector corresponding to a first singular value and spanning a sample signal space for determining a remaining signal after removing a known leading edge. FIG. 6 shows a similarity metric applied to the likelihood matrix of FIG. 5. Referring to FIGS. 5 and 6, a similarity metric image 190 shows intersecting rings 192 around the signal source 150.

At the correct scan grid location under the no multipath condition, the region defined by $F_{(x,y)}$ contains the same signal for each receiver; the leading edge of the transmitted waveform. The first submetric is therefore derived from the coherent integration of the leading edge of the transmitted waveform using the singular vector extracted from $U_F$ matrix that corresponds to the first singular value and spans the sample signal space of the matrix $F_{(x,y)}$. We first define the components of the SVD as $$U_F = [u_{F,1} u_{F,2} u_{F,M}] tm \quad (3.19)$$

$$\Sigma_F = \text{diag}([\sigma_{F,1}^2 \sigma_{F,N}^2 \ldots \sigma_{F,N}^2]) \quad (3.20)$$

$$V_F = [v_{F,1} v_{F,2} \ldots v_{F,N}], \quad (3.21)$$

from which $u_{F,1}$ is used to define $$\hat{\omega} u_{F,1}{}^T \mathbf{s}_{a,tx}{}^H (\mathbf{s}_{a,tx}{}^H \mathbf{s}_{a,tx})^{31\,1} \quad (3.22)$$

where $s_{a,tx}$ is the known leading edge portion of the transmit waveform. The final similarity submetric is then defined as $$\frac{1}{\tau_{l_{(x,y)}}} = \frac{1}{\sum_{l=0}^{a-1} |u_{F,1} - \hat{\omega} s_{a,tx}|} \quad (3.23)$$

Figure 7:
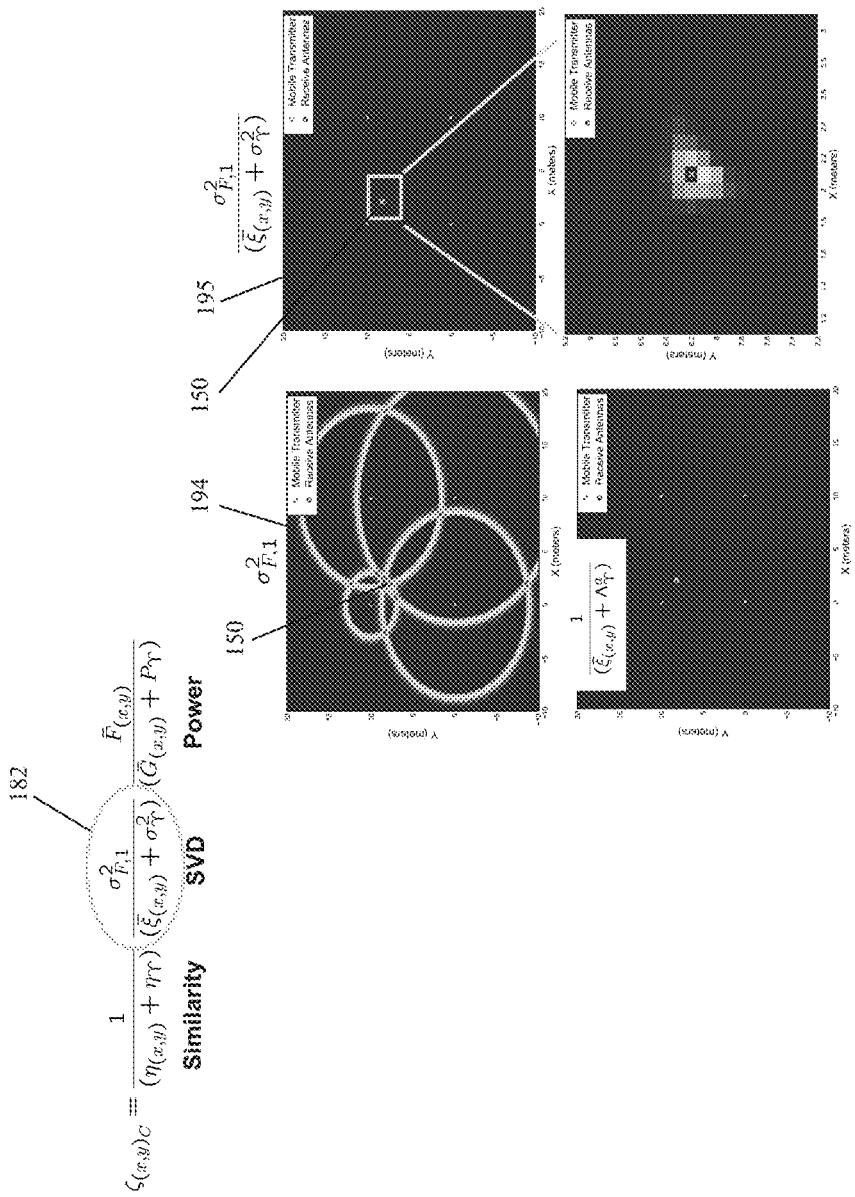
FIG. 7 shows a SVD (Singular Value Decomposition) metric applied to the likelihood matrix of FIG. 5.

FIG. 7 shows a SVD (Singular Value Decomposition) metric applied to the likelihood matrix of FIG. 5. The SVD metric is for rephasing the values associated with each location for mitigating a common time shift across the gathered sampled values. In FIG. 7, the SVD metric is applied to yield metric images 194 and 195, denoting a graphical clustering around the signal source 150.

The SVD submetric uses components from the SVD of both the $F_{(x,y)}$ and $G_{(x,y)}$ metrices. Specifically, we use the largest singular value of $F_{(x,y)}$, which was defined in (3.20) as $\sigma_{F,1}^2$ and the largest singular value from $G_{(x,y)}$ along with it's corresponding singular vector that spans the receiver signal space. If we define the decomposition components of $G_{(x,y)}$ defined in (3.16) as $$U_G = [u_{G,1} u_{G,2} u_{G,M}] \quad (3.24)$$

$$\Sigma_G = \text{diag}([\sigma_{G,1}^2 \sigma_{G,N}^2 \ldots \sigma_{G,N}^2]) \quad (3.25)$$

$$V_G = [v_{G,1} v_{G,2} \ldots v_{G,N}], \quad (3.26)$$

then mathematically we identify $\sigma_{G,1}^2$ and $v_{G,1}$ as the largest singular value and the corresponding right singular vector as the elements of interest for the SVD submetric.

Figure 8:
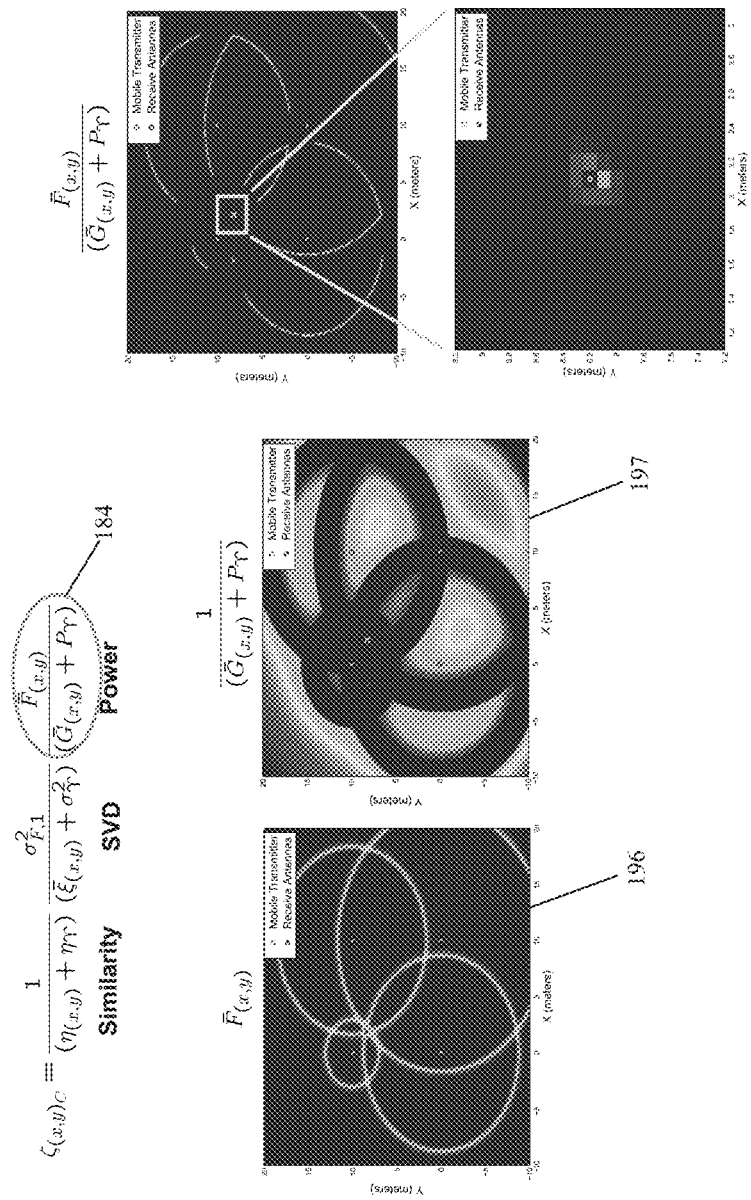
FIG. 8 shows a power metric applied to the likelihood matrix of FIG. 5.

FIG. 8 shows a power metric applied to the likelihood matrix of FIG. 5. The power metric is indicative of a strength of the sampled signal, such that the first region represents larger values than the second region for scan grid locations having a higher likelihood. Referring to FIGS. 5 and 8, the power metric 184 yields metric images 196 and 197, illustrating a convergence at the signal source 150. Configurations herein define the power submetric as:

$$\frac{\overline{F}_{(x,y)}}{\overline{G}_{(x,y)}}.$$

At the correct scan grid location, it is expected to have signal content in F(x;y) and noise in G(x;y). As signal content increases in F(x;y), the power submetric increases. If signal content protracts itself from G(x;y), the power submetric decreases. The maximum of the power metric under ideal conditions (no interference) will always be at the transmitter location where the power of the signal is large in the F(x;y) region and the power of G(x;y) is small with only noise, both conditions which increase the power submetric.

Combining the submetrics yields the final CART metric:

$$\zeta_{(x,y)_C} = \frac{1}{(\tau_{l_{(x,y)}} + \eta_Y)} \frac{\sigma_{F,1}^2}{(\xi_{(x,y)} + \sigma_Y^2)} \frac{F_{(x,y)}}{(G_{(x,y)} + P_Y)}$$

As indicated above, alternate configurations may employ a subset of these or additional metrics to refine the result.

Figure 9:
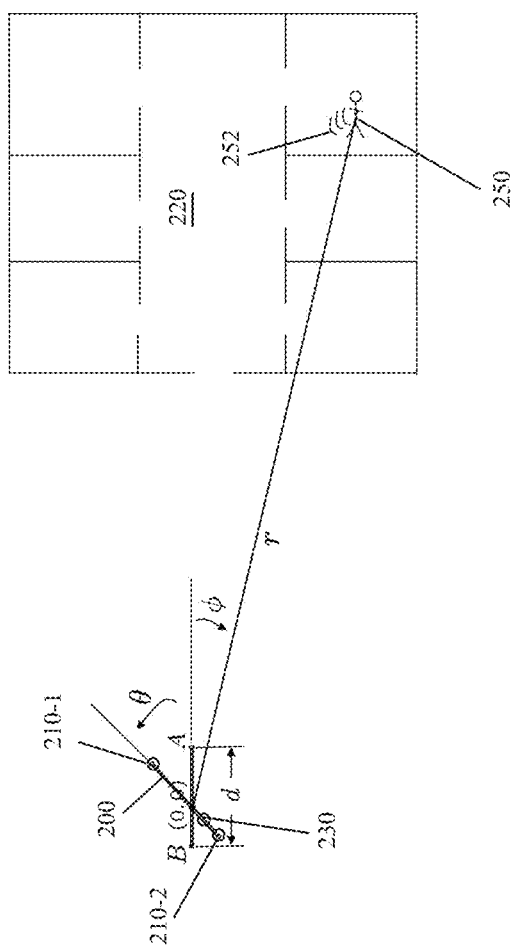
FIG. 9 shows a homing wand adapted for finding a transmitter appurtenant to a distressed first responder in a walled interior structure.

FIG. 9 shows a homing wand adapted for finding a transmitter appurtenant to a distressed first responder in a walled interior structure. In the example of FIG. 9, a particular configuration of the disclosed approach is embodied in a homing wand 200 adapted for finding a finding a transmitter 250 worn by a distressed first responder in a walled interior structure 220.

The structure of the homing wand 200 includes receivers 210-1, 210-2 at opposed ends of the wand or other portable frame. Signals 252 from the transmitter 250 are sampled as above. The wand 200 also includes an angular sensor 230, such as a gyroscope, operable for receiving angular data indicative of a shift in position of the receivers relative to each other; and computing the likelihood matrix based on the angular data and the shift in position. Movement of the wand 200 through the structure 220 allows computation based on the known change in relative position of the receivers 210 for providing improved accuracy in view of multipath and other transmission constraints.

An additional metric provides for combining a motion solution with the position approaches disclosed above. The motion solution was computed using a low cost Inertial Navigation System (INS) driving a Kalman Filter. As is conclusively shown, one can benefit from the fusion of superior short term information from the INS with the stability of the RF ranging information for a better localization performance in a heavy multipath environment. Sampling is performed on the gyroscope data as follows:

$$\theta_k = \sum_{i=1}^{k} (\dot{\theta}_z - \beta_z)$$

where $\rho_z$ is the computed mean of the 10 second calibration, $\dot{\theta}_z$ is the raw gyroscope data, and $\theta_k$ is the current estimated gyroscope angle is then stored in allocated memory along with a time stamp. Example sample rates may be around 10 Hz for the range information and around 100 Hz for the gyroscope (angular sensor 230), however other rates may be employed. A time alignment is performed on the stored data based on the RF data and the gyroscope timestamps.

After data alignment, we now have a gyroscope angle and an associated RF data measurement at a 10 Hz rate. If we define the starting position of the wand antennas as $$\begin{bmatrix} A_x \\ A_y \end{bmatrix} = \begin{bmatrix} 0.71 \\ 0.00 \end{bmatrix} \quad (7.2)$$

$$\begin{bmatrix} B_x \\ B_y \end{bmatrix} = \begin{bmatrix} -0.29 \\ 0.00 \end{bmatrix} \quad (7.3)$$

where $A_x$ and $A_y$ describe the starting Cartesian position of antenna A and $B_x$ and $B_y$ describe the starting Cartesian position of antenna B, we can compute the receive antenna positions at time step k using a rotation. This is done using $$A_k = \begin{bmatrix} \cos(\theta_k) & -\sin(\theta_k) \\ \sin(\theta_k) & \cos(\theta_k) \end{bmatrix} \begin{bmatrix} A_x \\ A_y \end{bmatrix} \quad (7.4)$$

$$B_k = \begin{bmatrix} \cos(\theta_k) & -\sin(\theta_k) \\ \sin(\theta_k) & \cos(\theta_k) \end{bmatrix} \begin{bmatrix} B_x \\ B_y \end{bmatrix} \quad (7.5)$$

where $\theta_k$ is the stored and time aligned angle that corresponds to the current RF measurement.

FIG. 10 depicts leading edge detection in the configuration of FIG. 3. Referring to FIGS. 1, 3 and 10, in the disclosed approach, the sampled pulses for populating the data matrix A 152 result from range estimates from the signal source 150 to the receivers 110. In TWR, a requestor/responder approach employs transceivers, and information in the transmitted signals is utilized to align the waveforms for LED without a wired connection for timing information. Reciprocity in the return communication and computation of latency at the requestor and responder allow accurate determination of time of flight (TOF) for computing the distance. Gathering the signals as described therefore includes two way ranging using wireless synchronization of ultra-wide bandwidth (UWB) signals from the signal source and independent of a common clock signal between transmitter and receivers.

The requestor, defined as the signal source 150, sends the first of a series of short pulses in the form of a packet 300. After some unknown time of flight, t(f) 302, a lock is acquired on the incoming pulse at time t(rlo). The lock spot detection system can be thought of as an oscilloscope trigger system which is triggered by a prominent waveform feature—usually not the leading edge of the waveform owing to its small size and thus susceptibility to corruption by noise. It is acknowledged that the system is capable of storing and retrieving the data that both immediately precedes and succeeds the trigger position in the input waveform as is the case for the hardware utilized in the experiments to be discussed later. After a fixed amount of turn-around time, t(T) 306, relative to the responder lock spot, the responder (receiver 110) sends a pulse packet 308 back to the requestor 150. A Time-of arrival (TOA) of the received signals is computed based on alignment information in a reciprocity message (pulse packet back) sent from a responder back to a requestor.

The requestor then locks onto the responder's transmission at time t(tlo), around which it samples and records the arriving pulse. The sampled received waveforms for both components of the TWR transaction will be called scan data. In both cases, the scan data is corrupted by both noise and channel multipath as well as by uncertain time misalignments owing to the lock spot detection errors induced by the same noise and multipath distortions of the waveform. The time of the entire transaction can be written as:

$$t_{CT} = 2t_f + t_{r\epsilon} + t_T + t_{t\epsilon}$$

where are $t_{r\epsilon}$ and $t_{t\epsilon}$ are the difference between the true time of arrival of the pulse and the lock spot of the responder 110 and requestor 150 unit. The distance between the requestor and responder antenna can be computed using $r = t(f) \cdot c$, where c is the speed of light and r is the distance between the requestor and responder antennas.

In configurations herein, we compute the time at which the responder transmits, t(rTX), relative to the requestor clock. We begin by defining:

$$\epsilon_\Delta = t_{r\epsilon} - t_{t\epsilon}$$

and recognizing that:

$$t_T = \epsilon_\Delta = 2t_f + 2t_{r\epsilon}$$

which leads to the definition:

$$t_{rTX} = t_{tlo} - t_f - t_{t\epsilon}$$

$$= t_{tlo} - \frac{t_{CT} - t_T - \epsilon_\Delta}{2}$$

Thus, the transmit time of the responder can be computed by the requestor and is independent of the distance between the requestor and responder units. Unfortunately, the lock spot to leading edge difference is not measurable directly by the responder unit. It can be recognized, however, that and $$t_{r\epsilon} = t_{rlo} - t_{rle}$$

$$t_{t\epsilon} = t_{tlo} - t_{tle}$$

Yielding:

$$t_{rTX} = -\frac{1}{2}(t_{CT} - t_T - t_{rlo} - t_{tlo} + t_\Delta)$$

Where $t_{\Delta} = t_{rle} - t_{tle}$ is the time difference between the leading edges. An estimate of time can be computed using the scan data recorded at the requestor and responder units. The estimate of the time difference is given by:

$$\hat{t}_\Delta = \max_m |E[s_r[n+m]s_t^*[n]]| / f_s$$

where E[.] is the statistical expectation operator, sr[n] is the nth sample of the complex form of the responder scan data waveform, st[n] is the nth sample of the complex form of the requestor scan data waveform, and fs is the sample rate. This estimate is the value of m where the cross correlation achieves a maximum.

Those skilled in the art should readily appreciate that the programs and methods as defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of locating the source of a signal, comprising:
defining an area of interest as a discretized spatial region having a plurality of signal sources disposed in locations, the locations defined by a scan grid based on Cartesian positions;
gathering, for each location in the area of interest, a set of sampled values indicative of a computed range to a signal source based on detection of a leading edge of a signal received from the signal source;
rephasing the set of sampled values to generate a rephased set for accommodating a propagation delay in the sampled values, rephasing including applying an inverse of a propagation signal delay, the sampled values and the corresponding rephased values being identical to within a constant amplitude and phase factor of each other based on an accuracy of the computed range to the signal source;
subdividing the rephased set of values associated with each location into a first region and a second region based on periodicity of a time domain of the gathered signals by, for each location, each of the first and second regions contains values indicative of either the leading edge signal or noise;
determining if the first region is representative of the leading edge of a signal gathered from the signal source;
computing, for each value in the rephased set, a metric based on comparing the first region and the second region, the metric indicative of a computed likelihood that the location contains the signal source; and
rendering an indication of the location on the scan grid associated with the greatest computed likelihood of containing the signal source.

2. The method of claim 1 further comprising generating a metric image indicative of a likelihood that, for each location in the scan grid, the location contains the signal source.

3. The method of claim 1 wherein gathering the samples further comprises detecting a leading edge of a signal transmitted from the signal source, the leading edge detected by waveform alignment.

4. The method of claim 1 wherein the set of samples further comprises a data matrix indicative of a series of frequency samples taken from signals received from the signal source at each of a plurality of receivers in the area of interest, and the set of rephased values defines a likelihood matrix indicative of a likelihood that the corresponding location contains the signal source.

5. The method of claim 4 further comprising
designating the first region based on a first subset of elements of the likelihood matrix corresponding to a particular scan grid location;
designating the second region based on a last subset of elements of the likelihood matrix corresponding to a particular scan grid location;
concluding that if the first region includes the leading edge of the signal from the signal source, then the corresponding scan grid location includes the signal source.

6. The method of claim 5 further comprising determining that if the second region is representative of only noise, then the first region is indicative of the true location of the signal source.

7. The method of claim 4 wherein the likelihood matrix further comprises applying at least one of a similarity metric, a Singular Value Decomposition (SVD) metric and a power metric for the values of the likelihood matrix corresponding to each location.

8. The method of claim 7 wherein the applied metric includes a similarity metric based on coherent integration of a leading edge of the sampled signal using a singular vector corresponding to a first singular value and spanning a sample signal space for determining a remaining signal after removing a known leading edge.

9. The method of claim 7 wherein the applied metric includes a Singular Value Decomposition (SVD) for rephasing the values associated with each location for mitigating a common time shift across the gathered sampled values.

10. The method of claim 7 wherein the applied metric includes a power metric indicative of a strength of the sampled signal, such that the first region represents larger values than the second region for scan grid locations having a higher likelihood.

11. The method of claim 3 further comprising two way ranging using wireless synchronization information.

12. The method of claim 11 further comprising ultra-wide bandwidth (UWB) synchronization independent of a common clock signal between transmitter and receivers.

13. The method of claim 12 further comprising computing Time-of arrival (TOA) of the received signals based on alignment information in a reciprocity message sent from a responder back to a requestor.

14. The method of claim 4 further comprising rendering a metric map based image by
computing, for each scan grid location, the metric associated with the location; and
displaying a visual indication for each location based on the value of the metric for the scan grid location.

15. The method of claim 14 further comprising
receiving angular data indicative of a shift in position of at least two of the receivers relative to each other; and
computing the likelihood matrix based on the angular data and the shift in position.

16. A homing wand device for locating the source of a signal, comprising:
a plurality of receivers disposed at predetermined positions on a portable frame;
an angular motion sensor disposed on the portable frame and adapted for detecting movement of the plurality of sensors relative to each other;
a processor including matrix logic configured for:
receiving a definition of an area of interest as a discretized spatial region having a plurality of locations, the locations defined by a scan grid based on Cartesian positions;
gathering, for each location in the area of interest, a set of sampled values indicative of a computed range to a signal source based on detection of a leading edge of a signal received from the signal source;
rephasing the set of sampled values to generate a rephased set for accommodating a propagation delay in the sampled values, rephasing including applying an inverse of a propagation signal delay, the sampled values and the corresponding rephased values being identical to within a constant amplitude and phase factor of each other based on an accuracy of the computed range to the signal source;
subdividing the rephased set of values associated with each location into a first region and a second region based on periodicity of a time domain of the gathered signals by, for each location, each of the first and second regions contains values indicative of either a leading edge signal or noise;

determining if the first region is representative of a leading edge of a signal gathered from the signal source;

computing, for each value in the rephased set, a metric based on comparing the first region and the second region, the metric indicative of a computed likelihood that the location contains the signal source; and rendering an indication of the location on the scan grid associated with the greatest likelihood of containing the signal source.

17. A method for locating a target associated with a signal source, generating a locator matrix based on a rephasing of a plurality of signal samples, each emanating from a signal source in a location in an area of interest defined by a Cartesian scan grid by applying an inverse of a propagation signal delay, the locator matrix indicative of a likelihood that, for each location in the scan grid, the matrix indicates the likelihood of containing the source of the sampled signal, rephasing including applying an inverse of a propagation signal delay, the sampled values and the corresponding rephased values being identical to within a constant amplitude and phase factor of each other based on an accuracy of the computed range to the signal source the rephasing for accommodating a propagation delay in the sampled values;

selecting, for each location in the scan grid, a first region of values from the locator matrix and a second region of values from the locator matrix, the first and second regions chosen based on a periodicity of a time shift in the frequency domain of the sampled signals such that, for each location, each of the first and second regions contains values indicative of either a leading edge signal or noise, selecting the first and second regions further including computing a modulus of each location and sample value based on time shifts resulting in indices less than 1; and generating, based on the first region containing a leading edge of a signal from the signal source, and based on the second region containing noise, an image matrix indicative of, for each location in the scan grid, the likelihood that the selected location contains the signal source.

18. The device of claim 17 wherein gathering the signals further comprises two way ranging using wireless synchronization of ultra-wide bandwidth (UWB) signals from the signal source and independent of a common clock signal between transmitter and receivers.

19. The device of claim 18 further comprising computing Time-of arrival (TOA) of the received signals based on alignment information in a reciprocity message sent from a responder back to a requestor.

20. A computer program product on a non-transitory computer readable storage medium having instructions that, when executed by a processor, perform a method for locating and ranging, the method comprising:

receiving a definition of an area of interest as a discretized spatial region having a plurality of signal sources disposed in locations, the locations defined by a scan grid based on Cartesian positions;

gathering, for each location in the area of interest, a set of sampled values indicative of a computed range to a signal source based on detection of a leading edge of a signal received from the signal source;

rephasing the set of sampled values to generate a rephased set for accommodating a propagation delay in the sampled values, rephasing including applying an inverse of a propagation signal delay, the sampled values and the corresponding rephased values being identical to within a constant amplitude and phase factor of each other based on an accuracy of the computed range to the signal source;

subdividing the rephased set of values associated with each location into a first region and a second region based on periodicity of a time domain of the gathered signals by, for each location, each of the first and second regions contains values indicative of either the leading edge signal or noise;

determining if the first region is representative of a leading edge of a signal gathered from the signal source;

computing, for each value in the rephased set, a metric based on comparing the first region and the second region, the metric indicative of a computed likelihood that the location contains the signal source; and rendering an indication of the location on the scan grid associated with the greatest likelihood of containing the signal source.

21. The method of claim 1 wherein subdividing the first and second regions further includes computing a modulus of each location and sample value based on time shifts resulting in indices less than 1.

* * * * *